A process is provided for improving the reliability of sterilization of canned viscous food products by ensuring the proper amount and rate of rotation of cans during heat processing. Improvement in controlling the lethality of microorganisms can be accomplished. The method involves intervalically monitoring the rotation of the canned food in the processing equipment and utilizing the obtained rotation information to correct processing conditions to ensure commercial sterility.

United States Patent [19]

Rasmussen et al.

[11] Patent Number: 4,990,347
[45] Date of Patent: Feb. 5, 1991

[54] HEAT PROCESSING OF VISCOUS FOOD MATERIALS IN ROTATING CANS

[75] Inventors: Glenn O. Rasmussen, Champlin; Enrique Rotstein; Kenneth J. Valentas, both of Golden Valley; Shahed Zaman, St. Paul; Israel Saguy, Edina, all of Minn.

[73] Assignee: The Pillsbury Co., Minneapolis, Minn.

[21] Appl. No.: 321,616

[22] Filed: Mar. 10, 1989

[51] Int. Cl.$^5$ ............................................. B65B 55/00
[52] U.S. Cl. .................................. 426/232; 426/231; 426/405; 426/406; 426/407
[58] Field of Search ............... 426/232, 405, 406, 231, 426/407; 99/342, 371

[56] References Cited

U.S. PATENT DOCUMENTS

| 2,517,542 | 8/1950 | Clifcorn et al. | 426/405 |
|---|---|---|---|
| 2,972,293 | 8/1955 | Strehlow et al. | 99/371 |
| 3,961,150 | 6/1976 | Lewis et al. | 426/406 |
| 4,340,610 | 7/1982 | Nioras | 426/232 |
| 4,696,580 | 9/1987 | Kameda | 426/232 |
| 4,841,457 | 7/1989 | Clyne et al. | 426/236 |

FOREIGN PATENT DOCUMENTS

| 500629 | 3/1954 | Canada | 426/405 |
|---|---|---|---|
| 518459 | 11/1955 | Canada | 426/405 |

Primary Examiner—Donald E. Czaja
Assistant Examiner—D. Workman
Attorney, Agent, or Firm—William J. Connors

[57] ABSTRACT

A process is provided for improving the reliability of sterilization of canned viscous food products by ensuring the proper amount and rate of rotation of cans during heat processing. Improvement in controlling the lethality of microorganisms can be accomplished. The method involves intervalically monitoring the rotation of the canned food in the processing equipment and utilizing the obtained rotation information to correct processing conditions to ensure commercial sterility.

4 Claims, 4 Drawing Sheets

4,990,347

HEAT PROCESSING OF VISCOUS FOOD MATERIALS IN ROTATING CANS

BACKGROUND OF THE INVENTION

In the canning of food products it has been customary to heat food products in sealed cans in order to sterilize the food products and thereby render microorganisms and their spores such as *C.botulinum* and *B.stearothermophilus*, non viable. Various types of food products are processed in this manner, typical of which are vegetables like corn, peas, green beans and cream style corn. In the processing of such foods it is oftentimes important to reduce heat input as much as possible in order to minimize food quality deterioration and at the same time provide enough heat input to ensure commercial sterility. Cream style corn is susceptible to heat degradation (e.g. caramelization) and is viscous compared to the brine used for vegetables like peas, green beans and corn. Head space, i.e. the gas containing portion of the sealed container, is provided in the container to help achieve mixing of the food product within the can during rotation of the can to help improve heat transfer to the entirety of the product so that the entirety of the product will reach the desired sterilization temperature for the required period of time.

A widely used sterilization machine is a continuous sterilizer such as the Sterilmatic manufactured by FMC. Such a sterilizer accomplishes a quick heating of the food product by providing heat to the containers during axial rotation of the cans.

Surprisingly, it was found that even very minor changes in a container, for example a change in the finish and the type of source of container ends, etc., can drastically affect the rotation of the cans in a given piece of processing equipment even though the contents and the processing equipment are unchanged. It has been assumed, until the present invention, that can rotation did not appreciably change due to these factors. Experimental data as disclosed herein, substantiates these effects. It has further been found that the same rotation performance is not guaranteed when changing sterilizers, even if all variables are apparently equal. Thus, the present invention is a means of achieving what has been assumed to be achieved but was not achieved to the desired level of confidence and reliability. That is, the present invention helps assure the required degree of can rotation and hence product heating.

Axial rotation of cans such as metal cans containing foods is a very effective means of increasing the rate of heat transfer to the contained food product. A discussion of this is found in an article entitled "Heat Processing of Viscous Materials in Axially Rotating Cans", an engineering model by E. Rotstein, I. Saguy and K. Valentas, published in Proceedings of the International Symposium on Progress and Food Preservation Processes, Brussels, Belgium, 1:41–50, Apr. 12–14, 1988, the entire disclosure of which is incorporated herein by reference. With viscous food material such as cream style corn it was observed that the actual rotation rate of the cans is extremely important in order to balance the heating time or, more accurately, the heat input into the product in order to assure microorganism kill without unnecessary degradation of the food product. It was found by use of the present invention that heretofore believed to be unimportant factors can materially affect heating of the food products. For example, cans which differ in material or finish may rotate differently even when the processing equipment, rotation rate and the food product and its weight remain unchanged. It has been further found that cans with the same material and finish can rotate differently in different sterilization equipment with the same physical dimensions. It was also determined that within normal processing conditions the product viscosity within an allowable predetermined range, had a much smaller effect than variations in can rotation encountered during operation. Thus, the present invention provides an advance in the processing of canned foods, bringing a higher degree of confidence in the heat processing and sterilization effectiveness.

SUMMARY OF THE INVENTION

The present invention provides a means for and the process for more accurately heat processing canned food products in order to eliminate heretofore unrecognized variances in processing. This is accomplished by intervalically running a container through the heat processing system which contains the same food product as that being processed and a rotation counter within the container to obtain data indicative of heat processing effectiveness of the contained food product.

THE FIGURES

DETAILED DESCRIPTION

Figure 1:
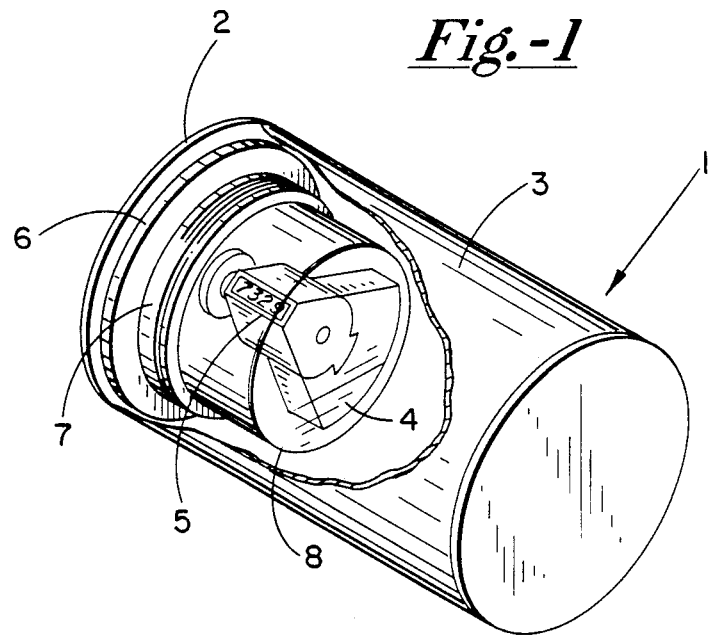
FIG. 1 is a fragmentary perspective view of a food container showing contained food product and a rotation counter installed therein.

Axial rotation of cans which have been filled leaving a head space is a very effective means of increasing the rate of heat penetration. The head space effectively promotes the rate of heat transfer by effecting increased mixing. This is particularly valuable when viscous products such as cream style corn (CSC) and soup are processed, because, generally, the shorter the heating time the better the quality of the product.

A widely used sterilizing system is the Sterilmatic cooker (FMC Corp., Canning Machinery Div., San Jose, Calif). The cans enter the cooker and are indexed into a revolving reel; the cans move through the machine in a helical pattern, rotating around their longitudinal axis as they travel the lower section of each helix. The pilot plant counterpart of this machine is known as the Steritort (FMC Corp.).

It is generally accepted that, when the Sterilmatic rotates at N rpm, the cans are subject to a mean frequency of rotation $N_c$ such that:

$$N = k_s N_c \tag{1}$$

with $k_s$ being a constant for a given product and a given can size. It was found that $k_s$ is also a function of the can type. Evidence gathered on a commercial system indicates that, for the same product and size can, differences in the material and/or finish of the can result in change in $N_c$. The following analysis illustrates the effect that such changes can have on the safety of the product. A correlation relating the heat transfer coefficient to process and product variables is used and a new equation which relates this coefficient with lethality is provided. With this information, the parametric sensitivity of a system to changes in processing variables can be assessed.

In a forced convection heat transfer situation, the dimensionless equation of motion is:

$$Dv/Dt^* = \frac{1}{Re} \nabla^{*2} v^* - \nabla^* p^* + \frac{1}{Fr} g/g \qquad (2)$$

where:

$$v^* = v/V \qquad (3)$$

$$t^* = tV/D \qquad (4)$$

$$\nabla = \nabla D \qquad (5)$$

$$p^* = (p - p_0)/\rho V^2 \qquad (6)$$

If the motion were the result of natural convection, eqn. (2) would be replaced by:

$$Dv^*/Dt^* = \frac{1}{Re} \nabla^{*2} v^* - \frac{Gr}{Re^2} T^* \qquad (7)$$

In a similar manner, the dimensionless energy equation neglecting viscous dissipation can be written:

$$DT^*/Dt^* = \frac{1}{Re\ Pr} \nabla^{*2} T^* \qquad (8)$$

Where the dimensionless temperature is:

$$T^* = \frac{T - T_0}{T_1 - T_0} \qquad (9)$$

Heat transfer to a can can be described by the dimensionless equation:

$$Nu = \frac{1}{2\pi L/D} \int_0^{L/D} \int_0^{2\pi} (-\partial T^*/\partial r^*)r^* = \frac{1}{2} d\theta\ dx^* \qquad (10)$$

where:

$$r^* = 2r/D \qquad (11)$$

Solution of eqns. (8) and (10) with suitable boundary condition provides an equation for $T^*$ which, when used in eqn. (10) results in:

$$Nu = \alpha_1 Re^{\alpha_3}(D/L)^{\alpha_4} \qquad (12)$$

If natural convection is superimposed upon forced convection, following a similar line of reasoning, it is expected that:

$$Nu = \delta_1 Gr^{\delta_2 2} Pr^{\delta_3} + \alpha_1 Re^{\alpha_2} Pr^{\alpha_3}(D/L)^{\alpha_4}$$

There is an additional source of turbulence due to the head space, where the energy used for agitation is transmitted to a volume decreased by $(L-H)$ instead of the full volume. This effect can be quantified by a correction head space factor $(L-H)/L$ in the forced convection term. Accordingly one expects eqns. (12) and (13) to take the form:

$$Nu = \alpha_1 Re^{\alpha_2} Pr^{\alpha_3} (D/L)^{\alpha_4} \left( \frac{L-H}{L} \right)^{\alpha_5} \qquad (14)$$

$$Nu = \delta_1 Gr^{\delta_2} Pr^{\delta_3} + \alpha_1 Re^{\alpha_2} Pr^{\alpha_3} (D/L)^{\alpha_4} \left( \frac{L-H}{L} \right)^{\alpha_5} \qquad (15)$$

Ouast and Siozawa (Quast, D. G. and Siozawa, Y. Y. 1974. Heat transfer rates during heating of axially rotated cans. Proc. IV Int. Congress Food Sci. and Technol. Vol. IV, 458–468.) presented a correlation for cans rotated continuously on two rubber coated rolls in a steam atmosphere. They used sucrose and carboxy methyl cellulose (CMC) solution as well as a number of fruit juice concentrates. Their correlation is of the type of eqn. (14):

$$Nu = 0.55\ Re\ Pr^{\frac{1}{3}} \left( \frac{L-H}{L} \right)^{-\frac{1}{3}} \qquad (16)$$

Soule and Merson (Soule, C. L. and Merson, R. L. 1985. Heat transfer coefficient to newtonian liquids in axially rotated cans. J. Food Eng. 8 330–46.) experimented in a similar manner using newtonian fluids (water and silicone oils). The resulting correlation is also of the type of eqn. (13), but they did not detect influence of head space, probably because of the narrow range explored. They incorporated a correction factor to account for the temperature dependence of viscosity:

$$Nu = 0.434\ Re^{0.571} Pr^{0.278}(D/L)^{-0.356}(\mu_b/\mu_w)^{0.154} \qquad 9\ 17)$$

Rao et al. (Rao, M. A., Cooley, H. J., Anantheswaran, R. C. and Ennis, R. W. 1985. Convective heat transfer to canned liquid foods in a Steritort. J. Food Sci. 50 150–154.) presented correlations of the type of eqn. (15). They experimented with newtonian (water, glycerin and aqueous sucrose solutions) and non-newtonian (aqueous guar gum solutions) fluids and a narrow range of head spaces. Their correlation for all non-newtonian systems was:

$$Nu = 2.6(Gr\ Pr)^{0.205} + 7.15 \times 10^{-7}(Re\ Pr\ D/L)^{1.837} \qquad (18)$$

Quast and Siozawa (supra) defined Nu on the basis of the overall heat transfer coefficient U. Both Soule and Merson (supra) and Rao et al. (supra) found that, for their ranges of viscosity and with steam outside the can, the heat transfer coefficient inside the can h was a good representation of U. They used $$Nu \times hD/k \qquad (19)$$

The Reynolds number used by Ouast and Siozawa (supra) was $Re = \pi D^2 N \rho / \mu$ (where N is in revolutions/second) while Soule and Merson (supra) and Rao et al. (supra) used:

$$Re = D^2 N \rho / \eta \qquad (20)$$

where $\eta$ for newtonian fluids was the newtonian viscosity $\mu$ while $\eta$ for non-newtonians, in the case of the latter authors, was:

$$\eta = KN^{m-1} g^{n-1} \left( \frac{3n+1}{4n} \right)^{n} \quad (21)$$

The Prandtl number in all three cases was:

$$Pr = c_p\eta/k \quad (22)$$

with the same proviso as above applying to $\eta$. The Grashof number was defined by Rao et al. (supra) as:

$$Gr = \rho^2 g D^3 \beta \Delta T/\eta^2 \quad (23)$$

Viscous foods are a non-newtonian system so one can use the same definitions as in Rao et al. (supra). An analytical expression which describes the relationship between h, process time, and $F_o$ is:

$$F_0 = \exp\left(\frac{T_R - T_0}{z}\right)\left( t - \frac{m_0 c_p}{hA} S \right) \quad (24)$$

where $$S = \sum_{m=1}^{M} \frac{(-1)^m}{mxm!} \left[ \frac{T_R - T_0}{z} \ln 10 \right]^m \left[ \exp\left(\frac{-mhAt}{m_0 c_p}\right) - 1 \right] \quad (25)$$

This equation allows, among other things, to obtain $F_o$ from values of h resulting from heat transfer correlations like those summarized above. It can also be used, given a value of h, to estimate $F_o$ at changing process times or initial temperatures.

As seen in FIG. 1 the counting device 1 is installed in a container which also contains head space and the food product of interest. The counting device 1 is suitably attached to the lid 2 of the container and the lid is sealed to the sidewall 3 of the container in a conventional manner. The counting device 1 can be a metal Veeder Root model MS01 and is suitably secured to the lid 2 for example by a spot welded flange, 6 or other fastening device or by glue if desired. As illustrated the counting device includes a counter 5 which has an off center weight 4 which because of its off center nature does not rotate with the can, thereby at each rotation, a count is made and recorded. The counter 5 is contained in a clear jar 8 which has a lid 7 secured to the flange 6.

Figure 5:
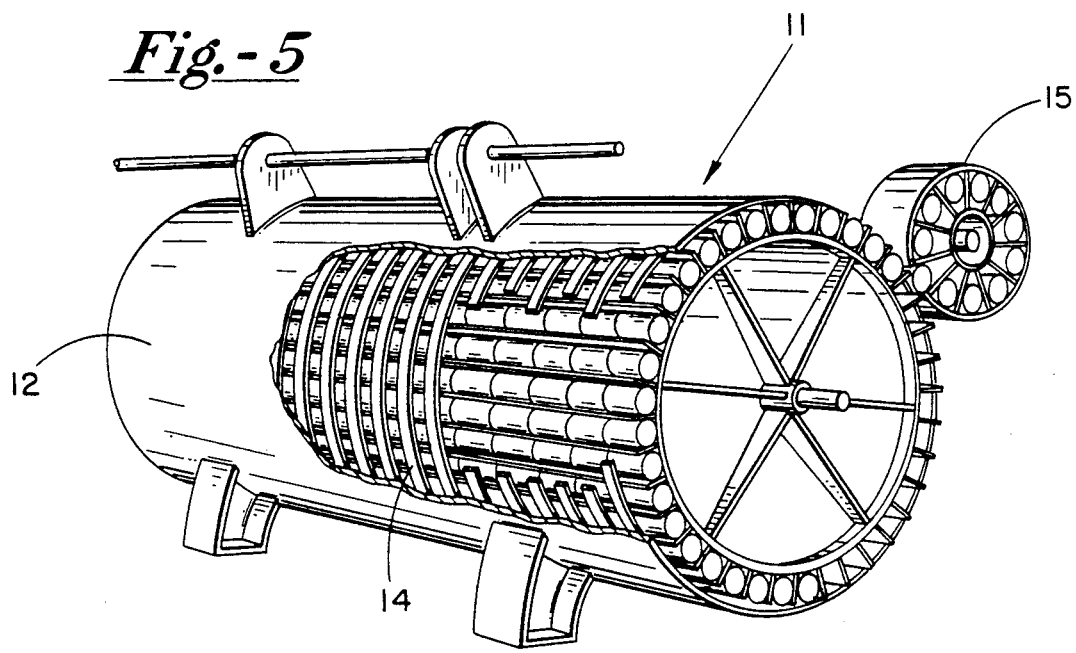
FIG. 5 is a fragmentary perspective view of a sterilizer using a helical conveying track.

FIG. 5 illustrates a sterilizer. The sterilizer 11 is comprised of a housing 12 having can conveying means 14 therein. As illustrated the conveying means 14 is disposed in a helical manner from one end of the sterilizer to the other. Cans are fed into one end of the sterilizer and are withdrawn from the opposite end with a suitable discharge means 15. Heat is supplied to a chamber inside the sterilizer 11 by suitable means (not shown). Such sterilizers are well known in the industry and need not be further described herein.

A rotation counting device 1 was used to measure cumulative revolutions in cans processed in a Sterilmatic. The product was Green Giant® cream style corn. Two types of cans were used, electronically tin plated (ETP) and tin free steel (TFS). The latter are covered with a polymeric coating which occasionally tends to accumulate on the reel surface. This process is known as conditioning. The experiments were performed in a conditioned cooker, using a 14.6 min. period of pre-heating and cooking, standard product and standard processing conditions (reel rpm = 8.7); preheat temperature of 111° C. for 5.9 minutes and sterilizer temperature 129° C. for 3.7 minutes).

In another series of experiments, Green Giant® cream style corn was processed in a Steritort. The processing time was 15.3 min., with a retort temperature of 132° C., 303×406 cans and 0.25 inch head space. Reel rotations were 4, 6 and 8 rpm.

Table 1 shows the results of can rotation trials. There is a 99.99 statistical confidence that the difference in the TFS and ETP can rotation is not a chance occurrence. As it can be seen, there is 18.7 less rotations for TFS mean than for ETP mean cans. Further, TFS cans rotating one standard deviation below their mean are 29.1 below the ETP mean; two standard deviations below, they rotate 39.5 less than the ETP mean.

TABLE 1

| Can Rotation Trial (300 × 407 cans in a Sterilmatic) | | | |
|---|---|---|---|
| | | Rotation | |
| Can Type | Number of Samples | Mean | Standard Deviation |
| ETP | 30 | 621.7 | 32.7 |
| TFS | 28 | 505.3 | 64.7 |

In yet another series of experiments can rotation was measured with the rotation counters in three different Sterilmatics. Overall dimensions of cans and Sterilmatics were the same, reel rotations were 8 rpm, retort temperature was 132° C. and the processing time was 15.25 min. Table 2 shows the results, which indicate significant difference in rotation performance. Mean can rpm is total rotations divided by process time.

TABLE II

| Mean Can RPM in Different Sterilmatics (8 rpm, 42 pocket, ETP 300 × 407 cans) | |
|---|---|
| Sterilmatic #1 | 42.9 rpm |
| Sterilmatic #2 | 35.4 rpm |
| Sterilmatic #3 | 31.4 rpm |

The implication of a loss of rotation in the lethality performance when sterilizing CSC have been studied by Berry et al. (Berry, M. R., Savage, R. A. and Neumann, D. G. 1977. Simulated Sterilmatic Processing of Cream Style Corn. Project 05618. Dept. of Health, Education and Welfare, F.D.A., Cincinnati, Ohio; and Berry, M. R., Savage, R. A. and Pflug, I. J. 1979. Heating characteristics of cream style corn processed in a steritort: effects of head space, reel speed and consistency. J. Food Sci. 44 831–835.). They also studied the influence of other process variables. Of those, because of established control procedures, the only other variable which was believed to possibly affect the process is the consistency of the product.

Figure 3:
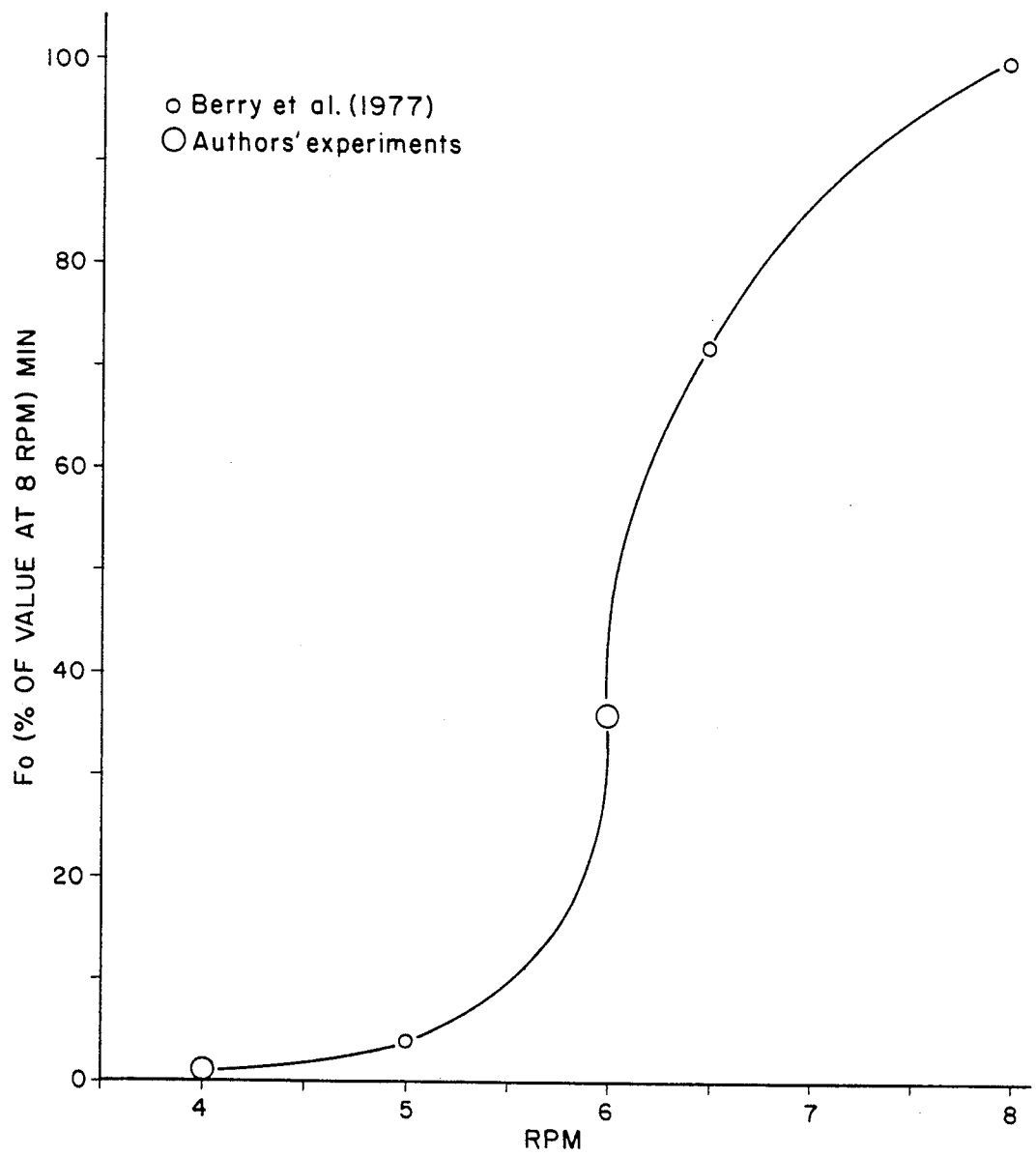
FIG. 3 is a graph showing lethality ($F_O$) as a function of heater reel rotation.

Production controls insure that consistency be between 9±1 in. Adams (Cefaly Engineering Lab, Stoughton, M.A.) units (10 sec.) at 38° C. Using results from Berry et al. (supra) and taking into account that 9 in. Adams units are equivalent to 75 Brabender units (paddle A), it was found that an increase in viscosity to the upper level corresponding to the above standard will decrease $F_o$ by 8.8. In turn, a decrease in rpm of 18.75 will decrease lethality by 26 and a decrease in rpm of 37.5 will lower $F_o$ to almost zero. In other words, if we linearize the effects within the region of concern, we find that the rate of lethality loss is 0.6 min. per unit increase in Brabender units and 9 min. per unit decrease in reel rpm. The Steritort runs at 4, 6 and 8 reel rpm were made to further evaluate the incidence of declining rpms. The resulting $F_o$ were converted to the process time used by Berry et al. (supra) using eqn. (24). FIG. 3 illustrates the decrease in $F_o$ from its base value at 8 rpm; we can see it is an exponential decay, accelerating as rpm decrease.

Figure 2:
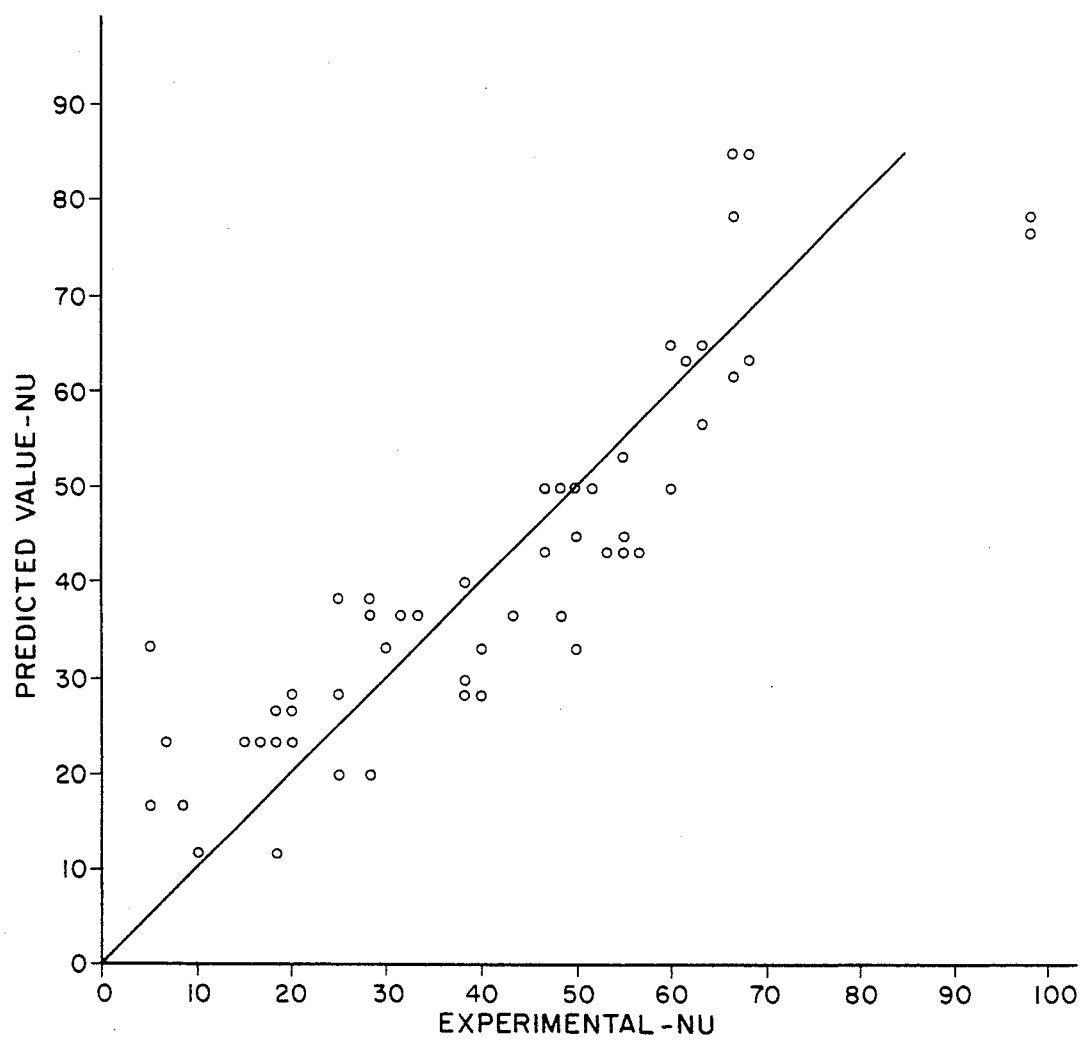
FIG. 2 is a graph illustrating predicted Nusselt numbers as a function of experimental Nusselt number value.

Comparison of isolated experimental values may be misleading because of local errors. The Berry et al. (1977) results, as shown in FIGS. 2 and 3, were correlated; this was possible because the authors reported their experimental results in thorough tabular form. The model equation was eqn. (15) and in this first attempt it was assumed $\delta_2 = \delta_3$ and $\alpha_2 = \alpha_3 = \alpha_4$ as in Rad (supra). The resulting correlation is:

$$N_u = 5.67 \times 10^{-12} (Gr\ Pr)^{2.413} + 8.359 \times 10^{-4} (Re\ Pr\ D/L)^{1.136} \times \left(\frac{L-H}{L}\right) - 20.979 \quad (26)$$

FIG. 2 shows the comparison between predicted and experimental Nusselt numbers, indicating an acceptable fit. Table 3 illustrates a representative case. It can be seen that natural convection contributes little to the process, which is consistent with the important influence of rotation discussed above.

TABLE 3

| Base case. | |
|---|---|
| Reel rpm, | N = 8 |
| Mean temperature, | $T_{mean}$ = 203° F. |
| Head space, | H = 0.25 in. |
| Consistency, | 9 in Adams units |
| Process time, | t = 16 min. |
| Nusselt number, | Nu = 61.19 |
| Natural convection, | 4.9% |
| Forced convection, | 95.1% |
| Heat transfer coefficient | h = 264.5 J/sm$^2$ K |

Equation (26) permits a preliminary study of parametric sensitivity. A 10% increase in consistency above the base case results in a 1% decrease in heat transfer coefficient and a 1.3% decrease in the sterilizing value $F_o$. Decreasing rpm by 16% and result in lowering h by 9.3% and 29.3% and $F_o$ by 27.3% and 64.5%, respectively. The latter results are obtained calculating $F_o$ from h using eqn. (24).

Figure 4:
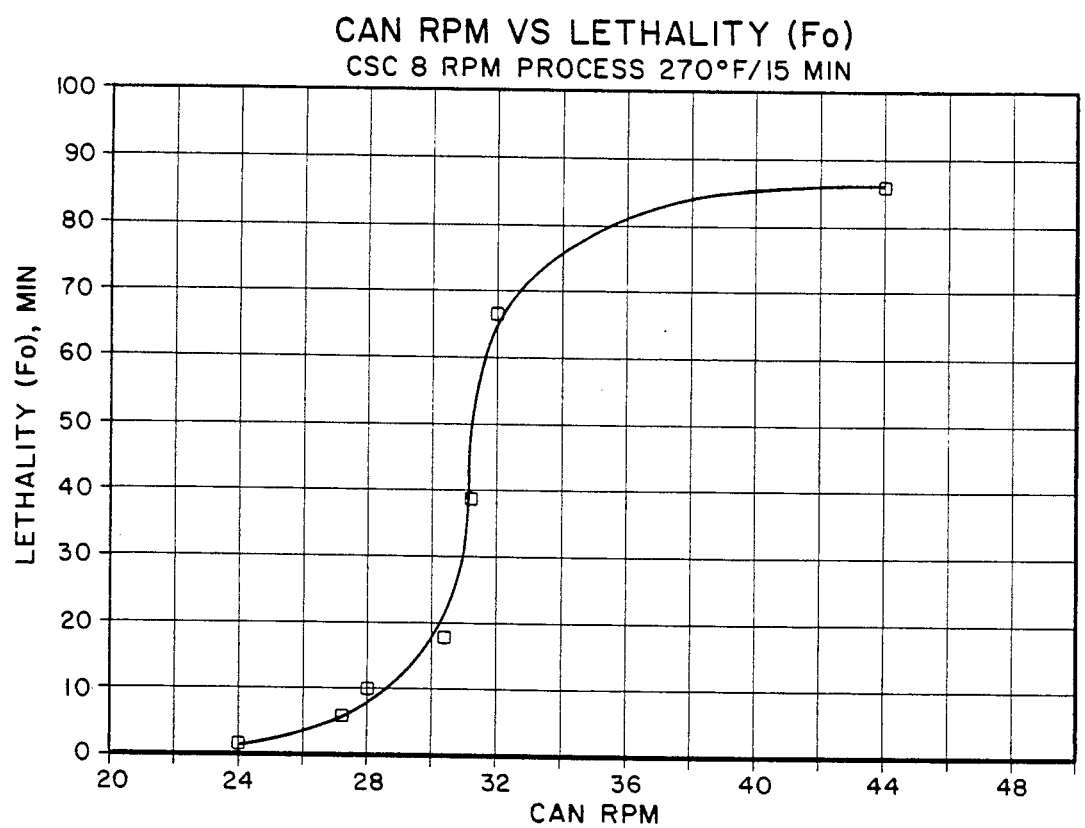
FIG. 4 is a graph illustrating lethality as a function of can rpm developed experimentally in a laboratory, simulating a sterilization process with a reel rpm of 8, cook time of 15 minutes and steam temperature of 270° F.

A laboratory simulator was used to reproduce changes in can rotational speeds at constant reel speed. The equipment further allowed the monitoring and recording of internal can temperatures. The corresponding $F_o$ values were calculated from time-temperature data at each can rpm. The results are plotted in FIG. 4. The following are results of experimentation:
1. There is proof, within 99.99% statistical confidence, that TFS cans in a conditioned cooker rotate less than ETP cans. Tests showed that TFS cans rotated 18.7% less than ETP cans. Decreases of one and two standard deviations below the TFS mean represent a decrease of 29.1% and 39.5% with respect to the mean for ETP, respectively.
2. Because of established production control procedures, variations in product consistency within the allowable range is the only major variable, other than rpm, which could affect the sterilization process.
3. A product consistency change from the established mean of 9 Adam units to the upper level allowed, 8 Adams units, will decrease the sterilizing value $F_o$ by 8.8%. This is the most unfavorable case, considering isolated experimental values. A parametric sensitivity study suggests that a 10% increase in consistency should result in a 1.3% decrease in $F_o$.
4. A decrease in rpm of 18.75% will decrease $F_o$ by 26% and a decrease of 37.5% will lower it to near zero. The parametric sensitivity study corroborates this finding.

The foregoing illustrates the effectiveness of the present invention. It is preferred that any time a container change or other processing conditions change is made in the processing line that an evaluation of container rotation be made as set forth above. Further, it is preferred that intervalically, including periodically, a rotation evaluation be made to ensure processing standards compliance. It is preferred that rotation be measured one to two times per hundred hours of operation.

The present invention is particularly useful with cream style corn and other viscous products like soup. Viscosity of most food products is characterized by consistency (K) and flow behavior index (n), measured using a Brookfield viscometer (e.g. Model HBT, spindle 2, Brookfield Engineering Lab, Stoughton, Md), a Haake viscometer or analogous instruments. Typical values for cream style corn are K=8.5 Pa s$^{n-1}$ and n=0.315 at 190° F. For soups and sauces at 55° F, K=3.6—5.6 Pa s$^{n-1}$ and n=0.5095 (Holdsworth, S.D. Processing of non-newtonian foods, Process Biochemistry 4 15, 1969). Consistency of such products is in the range of between about 20 and about 32 at 82° C. as measured by an FMC consistometer using paddle B. In this case it is preferred that rotations be measured on a basis of about one to two times per hundred hours of operation and that the can rotations be maintained at about 32 to about 46 rpms. The sterilizing environment temperature and time are sufficient to effect sterilization and are preferably in the range of between about 130° C. and about 140° C. for a heating time of approximately 12 to 20 minutes with a sterilizer reel rotating at about 6 to 10 rpm.

With the practice of the present invention container rotation, once established, should be maintained such that at least about 99%, preferably at least about 99.9% and most preferably at least about 99.99% of the containers fall within the preselected container rotation standards.

The above functional relationships were developed in a system with fixed parameters such as steam temperature, reel rpm, heating time, etc. It is to be understood that an expanded functional relationship or algorithm can be provided which take these and other factors or parameters into account and thereby provide greater flexibility in operation adjustments. Other parameters which can be included in a functional relationship are the operating temperature, reel rpm, heating time, viscosity or consistency of the food, etc., with the statistical method of doing so being well known in the art.

In operation, a counter containing container goes through the processing equipment to provide a count on the number of rotations of a container. This generated number is compared to the number of rotations in a functional relationship that relates the number of rotations to lethality. The Process and/or container can then be modified to provide the desired number of rotations and/or operating conditions to provide the desired degree of lethality, or more accurately, the confidence level for the lethality in the product. Further, it is to be understood that a standard number of rotations can be established when the other operating conditions are fixed and the number of rotations generated by the counter can be compared to the standard and the desired modifications can be made to achieve the predetermined confidence level for lethality.

In the practice of the present invention, the required degree of rotation, head space, processing temperature and microorganism destruction effectiveness are determined as set forth above. When a processing condition is changed, for example a change in end finish technique, etc. is made, a sampling number of containers containing a counter, product and head space are run through the processing line and the degree of rotation is determined to evaluate whether a change in the processing is further needed. If not, then the processing line can be utilized as is. If the container rotation is not at the required level, then the container, processing equipment, heating time and/or temperature can be changed to accommodate the change. For example, the can end can be changed to ensure the correct number of rotations, the product consistency can be changed to ensure adequate circulation of heat within the container, the degree of container rotation can be changed by changing the sterilization equipment or the temperature can be raised or lowered to effectuate adequate heating in accordance with the output information from the test procedure. Further, thereafter, additional monitoring of the processing conditions can be evaluated either intervalically or periodically as set forth above.

The following is a list of nomenclature for the symbols used in the above formulas:

| Nomenclature | |
| --- | --- |
| D | can diameter |
| $F_o$ | sterilizing value |
| Fr | Froude number |
| g | gravity constant |
| Gr | Grashof number |
| H | liquid height |
| h | product side heat transfer coefficient |
| K | consistency |
| k | thermal conductivity |
| $k_s$ | constant relating N and $N_c$ |
| L | can length |
| $m_o$ | product net weight |
| n | flow behavior index |
| N | reel rpm |
| $N_c$ | can rpm |
| p | pressure |
| $p_o$ | reference pressure |
| Pr | Prandtl number |
| r | radial distance |
| Re | Reynolds number |
| t | time |
| T | temperature |
| $T_o$ | initial temperature |
| $T_R$ | retort temperature |
| $T_f$ | final temperature |
| U | overall heat transfer coefficient |
| v | velocity |

| Nomenclature -continued | |
| --- | --- |
| V | characteristic speed |
| x | axial distance |
| z | inverse of the slope of the thermal death time curve |
| $a_1, a_2, a_3, a_4, a_5$ | correlating constants |
| $\delta_1, \delta_2, \delta_3$ | correlating constants |
| $\beta$ | volume expansivity |
| $\eta$ | generalized viscosity |
| $\mu$ | newtonian viscosity |
| $\mu_b$ | bulk fluid viscosity |
| $\mu_w$ | viscosity at the wall |
| $\rho$ | density |

What is claimed is:

1. A method of heat processing a viscous food product, said method comprising:
    (a) placing food product in a plurality of similar containers, said food having a consistency in the range of between about 20 and about 32 prior to completion of heat processing;
    (b) associating counter means with at least one of said containers containrn said food product;
    (c) placing said containers in a heat processor means for heating said containers and food product, said heat processor means being operable for rotating said containers during heating; and
    (d) counting the number of rotations of said at least one container and comparing said number of rotations to the number of rotations in a functional relationship that relates number of rotations to lethality and modifying at least one of said process and container, if necessary, such that the number of rotations of containers containing product is adequate to achieve a predetermined confidence level for lethality for said product.

2. A method of heat processing a viscous food product, said method comprising:
    (a) placing food product in a plurality of similar containers, said food having a consistency in the range of between about 20 and about 32 prior to completion of heat processing;
    (b) placing said containers in a heat processor means for heating said containers and food product, said heat processor means being operable for rotating said containers during heating; and
    (c) prior to completing a substantial portion of a production run after the initiation of a processing or container change, counting the number of rotations of said at least one container and comparing said number of rotations to the number of rotations in a functional relationship that relates number of rotations to lethality and modifying at least one of said process and container, if necessary, such that the number of rotations of containers containing product is adequate to achieve a predetermined confidence level for lethality for said product.

3. A method as set forth in claims 1 or 2 wherein:
    (a) said counter means is positioned inside said at least one container.

4. A method as set forth in claim 3 wherein:
    (a) said at least one container is intervalically introduced into said heat processing means.

* * * * *